(12) United States Patent
Kirk et al.

(10) Patent No.: US 6,883,297 B2
(45) Date of Patent: Apr. 26, 2005

(54) APPARATUS FOR ENCLOSING MATERIAL IN A NET

(75) Inventors: Edward Kirk, Mundelein, IL (US); Robert Pinto, Chicago, IL (US); Eggo Haschke, Deerfield, IL (US)

(73) Assignee: Poly-Clip System Corp., Mundelein, IL (US)

( * ) Notice: Subject to any disclaimer, the term of this patent is extended or adjusted under 35 U.S.C. 154(b) by 0 days.

(21) Appl. No.: 10/787,988

(22) Filed: Feb. 26, 2004

(65) Prior Publication Data

US 2004/0168405 A1 Sep. 2, 2004

Related U.S. Application Data

(63) Continuation-in-part of application No. 10/618,562, filed on Jul. 11, 2003.
(60) Provisional application No. 60/395,199, filed on Jul. 12, 2002.

(51) Int. Cl.$^7$ .......................... B65B 51/04; B65B 61/14; B65B 61/26
(52) U.S. Cl. ...................... 53/502; 53/131.2; 53/134.1; 53/136.1; 53/138.2; 53/576
(58) Field of Search .................. 53/134.1, 138.1–138.4, 53/413, 416, 417, 502, 576, 131.2, 136.1

(56) References Cited

U.S. PATENT DOCUMENTS

| | | | |
|---|---|---|---|
| 1,505,218 A | | 8/1924 | Sartore |
| 1,508,155 A | | 9/1924 | Berg |
| 1,873,286 A | | 8/1932 | Chase |
| 3,092,952 A | * | 6/1963 | Johansson .................. 53/134.1 |
| 3,389,533 A | * | 6/1968 | Tipper et al. ............... 53/134.1 |
| 3,499,259 A | | 3/1970 | Tipper et al. |
| 3,540,184 A | | 11/1970 | Ashton |
| 3,939,628 A | | 2/1976 | Schjeldahl |
| 4,031,592 A | | 6/1977 | Schnell |
| 4,044,450 A | | 8/1977 | Raudys et al. |
| 4,091,595 A | | 5/1978 | Pelster et al. |
| 4,107,903 A | * | 8/1978 | Wickersheim ............. 53/138.4 |
| 4,165,593 A | | 8/1979 | Niedecker |
| 4,190,690 A | | 2/1980 | Rabeneck et al. |
| 4,247,005 A | * | 1/1981 | Buxton ...................... 53/134.1 |
| 4,537,006 A | * | 8/1985 | Pieri ......................... 53/134.1 |
| 4,551,962 A | | 11/1985 | Kawahara |
| 4,593,516 A | * | 6/1986 | Alameda et al. ........... 53/138.3 |
| 4,675,945 A | * | 6/1987 | Evans et al. ............... 53/138.4 |
| 4,753,538 A | | 6/1988 | Jorda |
| 4,825,628 A | | 5/1989 | Brooks |
| 4,951,447 A | | 8/1990 | Denda et al. |
| 5,165,216 A | * | 11/1992 | May et al. .................... 53/413 |
| 5,269,054 A | * | 12/1993 | Poteat et al. ............... 53/138.4 |
| 5,300,344 A | * | 4/1994 | Niedecker ................... 428/131 |
| 5,354,193 A | | 10/1994 | Kupcikevicius |

(Continued)

FOREIGN PATENT DOCUMENTS

| | | |
|---|---|---|
| EP | 0 823 376 | 2/1998 |
| EP | 0 930 233 | 7/1999 |
| EP | 1 031 512 | 8/2000 |
| FR | 2 463 059 | 2/1981 |
| WO | WO 98/34845 | 8/1998 |

*Primary Examiner*—Stephen F. Gerrity
(74) *Attorney, Agent, or Firm*—Trexler, Bushnell, Giangiorgi, Blackstone & Marr, LTD.

(57) ABSTRACT

An apparatus and method of enclosing material in a net and supplying a handle for ease of carrying the netted material, comprising clippers, irises, and a handle maker. A conveyor carries the material to a pair of irises. The irises gather the netting around the material, the first clipper cuts and closes the netting, and the handle maker forms a loop out of the severed netting. The second clipper attaches the loop back to the netting to form a handle. A scale can be used to weigh the material and a printer can create a label, with the weight or whatever other information is desired, for attachment to the netting.

31 Claims, 11 Drawing Sheets

U.S. PATENT DOCUMENTS

| | | |
|---|---|---|
| 5,375,929 A | 12/1994 | Bergmoser |
| 5,476,673 A | 12/1995 | Sombrio |
| 5,755,022 A * | 5/1998 | Whittlesey ................. 53/138.4 |
| 5,782,056 A * | 7/1998 | May et al. ................. 53/138.4 |
| 5,842,915 A | 12/1998 | Plewa et al. |
| 5,918,447 A * | 7/1999 | Hanten et al. ............. 53/138.4 |
| 6,088,999 A * | 7/2000 | Olaechea ..................... 53/413 |
| 6,205,747 B1 | 3/2001 | Olaechea |
| 6,270,821 B1 * | 8/2001 | Grip et al. ................... 426/394 |
| 6,705,063 B1 * | 3/2004 | Topfer et al. .............. 53/138.4 |
| 6,729,102 B1 * | 5/2004 | Ailey et al. ................ 53/134.1 |
| 2001/0049924 A1 | 12/2001 | Guardiola |
| 2003/0131564 A1 | 7/2003 | Ailey, Jr. et al. |

\* cited by examiner

APPARATUS FOR ENCLOSING MATERIAL IN A NET

CROSS-REFERENCE

This patent application is a continuation-in-part of U.S. patent application Ser. No. 10/618,562, filed on Jul. 11, 2003, which claims the benefit of domestic priority of U.S. Provisional Application Ser. No. 60/395,199, filed on Jul. 12, 2002.

BACKGROUND OF THE INVENTION

This invention is generally directed to a system for enclosing materials, such as poultry, hams, or other materials, in netting and applying a handle and a label to the package.

The food industry often wishes to place products in nets. For example, large fowl, particularly turkeys, are encased in a plastic, see-through wrapper, for sanitary reasons, and then enclosed in netting for package integrity and ease of handling. The netting provides a strong structure to hold the turkey and allows the consumer to see the packaged material. It is important that the netting be tight around the package, to provide a pleasing appearance to consumers. There is a marketing advantage to having tightly-netted packages.

Nets are also applied to other food products, such as poultry, hams, sausages, or cheeses, prior to further processing, such as smoking.

In many cases, a handle is also applied to the package. Sausages and hams are enclosed in netting prior to cooking or smoking. The use of a handle is mandated, as there must be some way to handle the product in the cooking or smoking apparatus. The handles on these products are generally discarded after processing.

The handle is also useful to workers and customers in retail establishments, especially when the product is frozen, to make it easier to grab the product. A handle facilitates maneuvering the products, such as moving the products in and out of display cases, through check-out lanes, or in and out of the consumer's own refrigerator or freezer. Additionally, some consumers prefer to use a handle in order to avoid touching the package itself. Accordingly, there is a marketing advantage to having a handle on the product. In the case of turkeys or other poultry, it is important that the handle be applied at the rear-most point of the birds, which is where the legs point, to provide a pleasing appearance to purchasers.

Most of the same products also have a label of some type applied to the product. The label displays such data as weight, price per unit of weight, and total price. Other data, such as lot numbers, batch identification, product identification, or expiration date, are also common. The label can also contain identification information such as brand names or logos.

Netting is manufactured in a long, continuous tube, usually of a hard thermoplastic but also from natural fibers. The prior art method of enclosing a turkey in netting was to clip one end of the netting tube, place the turkey in the tube, manually pull the netting tightly around the turkey, clip the open end to enclose the turkey in the netting, and cut the netting. If a handle was desired, the additional step was, after the netting was pulled around the turkey, to form a loop while holding the netting tightly against the turkey, clip the netting at the close of the loop, and cut the netting.

This prior art method was labor intensive. Additionally, it was difficult to obtain uniform tightness of netting. Additionally, the method requires quite a bit of manual pulling and wrapping, making hand fatigue and injuries common.

Prior art methods to automate the process have been unsuccessful. One method used clippers built into gathering plates, but that method was awkward and slow because the gathering plates had to move. Since an opening must be at least 14 inches to accommodate the largest turkeys, the gathering plates had to move at least seven inches and, to be practical, had to move more like 10 inches. Accordingly, they were big, heavy, and slow. The prior art automated processes also worked only for consistently-sized turkeys. Application of a predetermined length of netting had to be based on the largest turkeys available. If the predetermined length of netting was sufficient to enclose the largest turkeys, however, all smaller turkeys would be netted loosely, which caused a marketing disadvantage.

Accordingly, there is a need for an apparatus and method of encasing material such as turkeys or hams, in netting, that will reduce labor costs by reducing the amount of labor required, easing the tasks of the workers that are required, and still provide a pleasing appearance to consumers. There is also a need for an apparatus and method of encasing material such as turkeys or hams, in netting, that will provide a loop in the netting to act as a handle, for subsequent processing or for consumer use. There is also a need for an apparatus and method of applying a label with identifying data, as part of the same netting process. The present invention meets these needs.

BRIEF SUMMARY OF THE INVENTION

The present invention discloses an apparatus and a method to insert material such as a turkey into netting, to pull the netting tightly around the material, to form a loop at one end for carrying the material, and to apply a label with data concerning the material. The apparatus and method described accomplish this purpose, and allow for encasing not just whole turkeys but also turkey breasts, hams, sausages, cheeses, and any other materials which one might desire to place in netting. The method and apparatus provide for pulling the netting tight by machinery, instead of by hand, easing the task of the worker and providing for a uniformly tight appearance.

The apparatus comprises a product tube, a first clipper, a handle-maker, and a second clipper. The apparatus places the material to be enclosed in a continuous cylinder of netting, previously clipped on one end. The apparatus pulls the material through two irises, pulling the netting about the material. The two irises then close, gathering the netting. One iris moves away, tightening the netting about the material. The handle maker grasps the gathered netting, pulling it tightly around the material, and further makes a loop. The first clipper clips the netting and also severs it. The second clipper clips the loop adjacent the material, to enclose the material in a tight net with a looped handle. The second clipper also clips a label to the loop, for product information.

A general object of the present invention is to provide a method and apparatus for encasing materials very tightly in netting, to reduce labor costs and injuries and to obtain an uniform appearance.

Another object of the present invention is to provide a method and apparatus to encase materials very tightly in netting and automatically to apply a label with identifying data concerning the packaged materials.

Another object of the present invention is to provide a method and apparatus to encase materials very tightly in netting and to apply a loop in the netting, to act as a handle for further processing or for consumer use.

Another object of the present invention is to provide an apparatus and method that accommodate variations in sizes of materials to be encased.

Another object of the present invention is to provide an apparatus and method to make the hocks of turkeys point in the correct direction.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings.

DETAILED DESCRIPTION OF THE ILLUSTRATED EMBODIMENT

Figure 1:
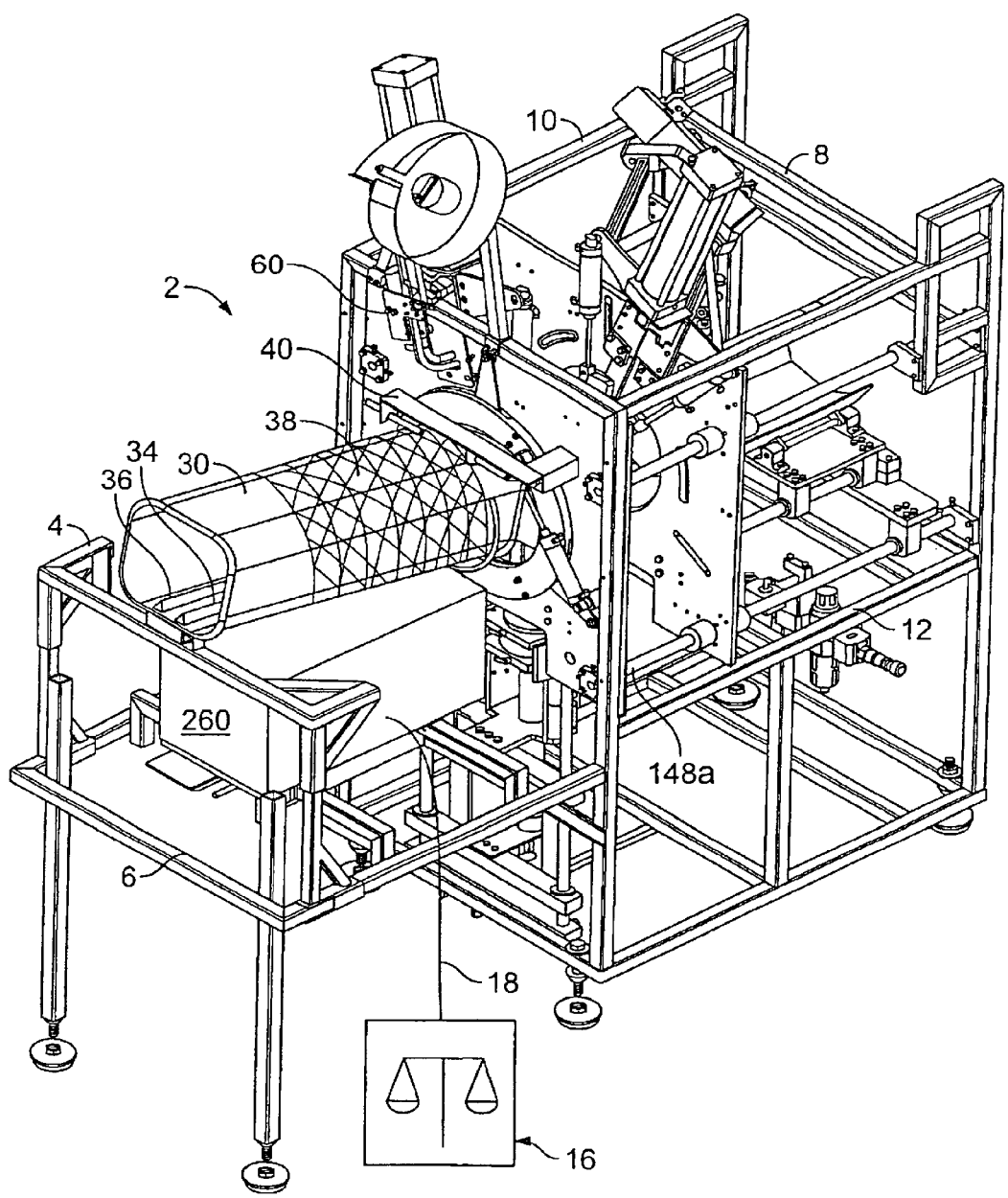
FIG. 1 is a front perspective view of the apparatus of the an embodiment of the present invention.
Figure 1A:
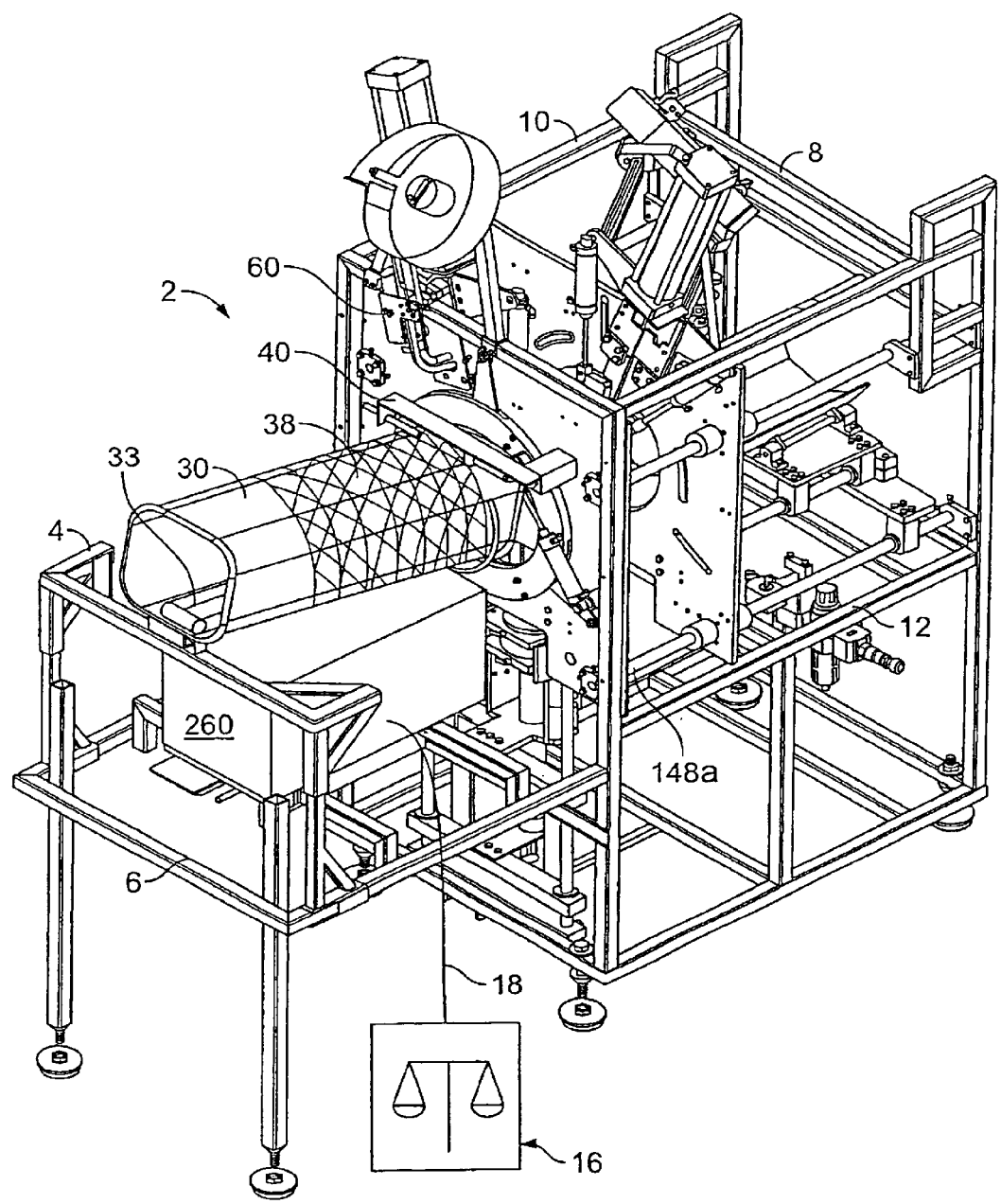
FIG. 1A is a front perspective view of the apparatus of another embodiment of the present invention.
Figure 1B:
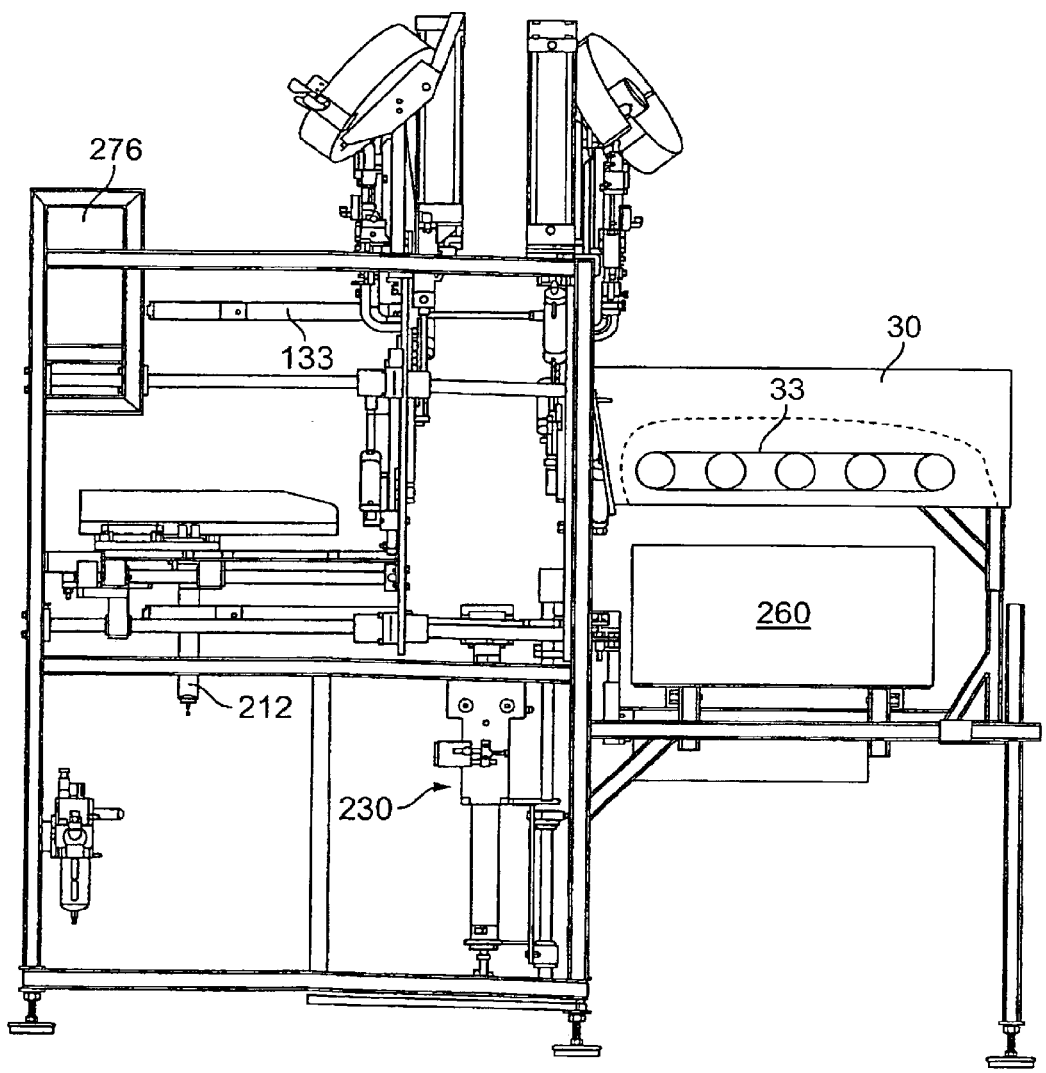
FIG. 1B is an elevation view of the product tube of one embodiment of the present invention, showing in cut-out view the conveyor.
Figure 2:
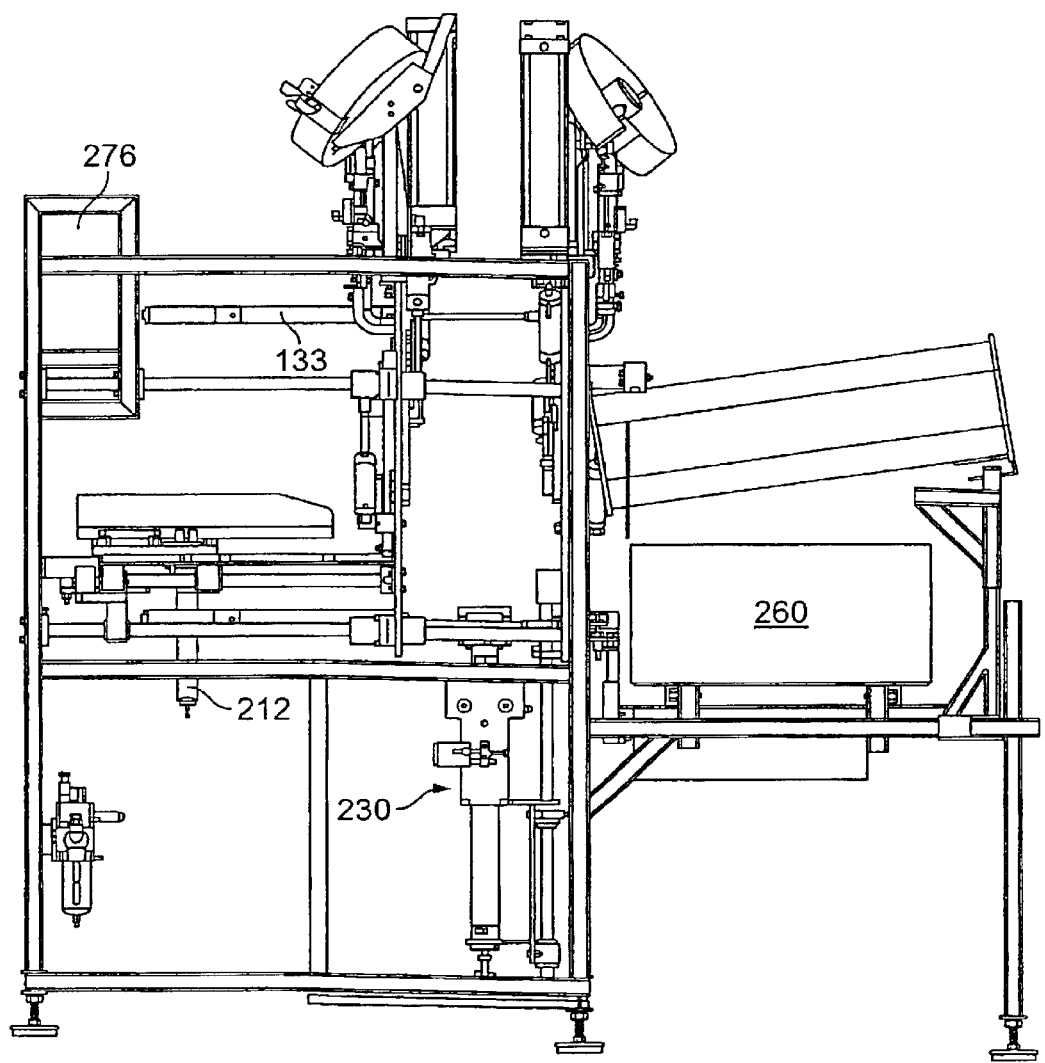
FIG. 2 is an elevation view of the apparatus of the preferred embodiment of the present invention.
Figure 3:
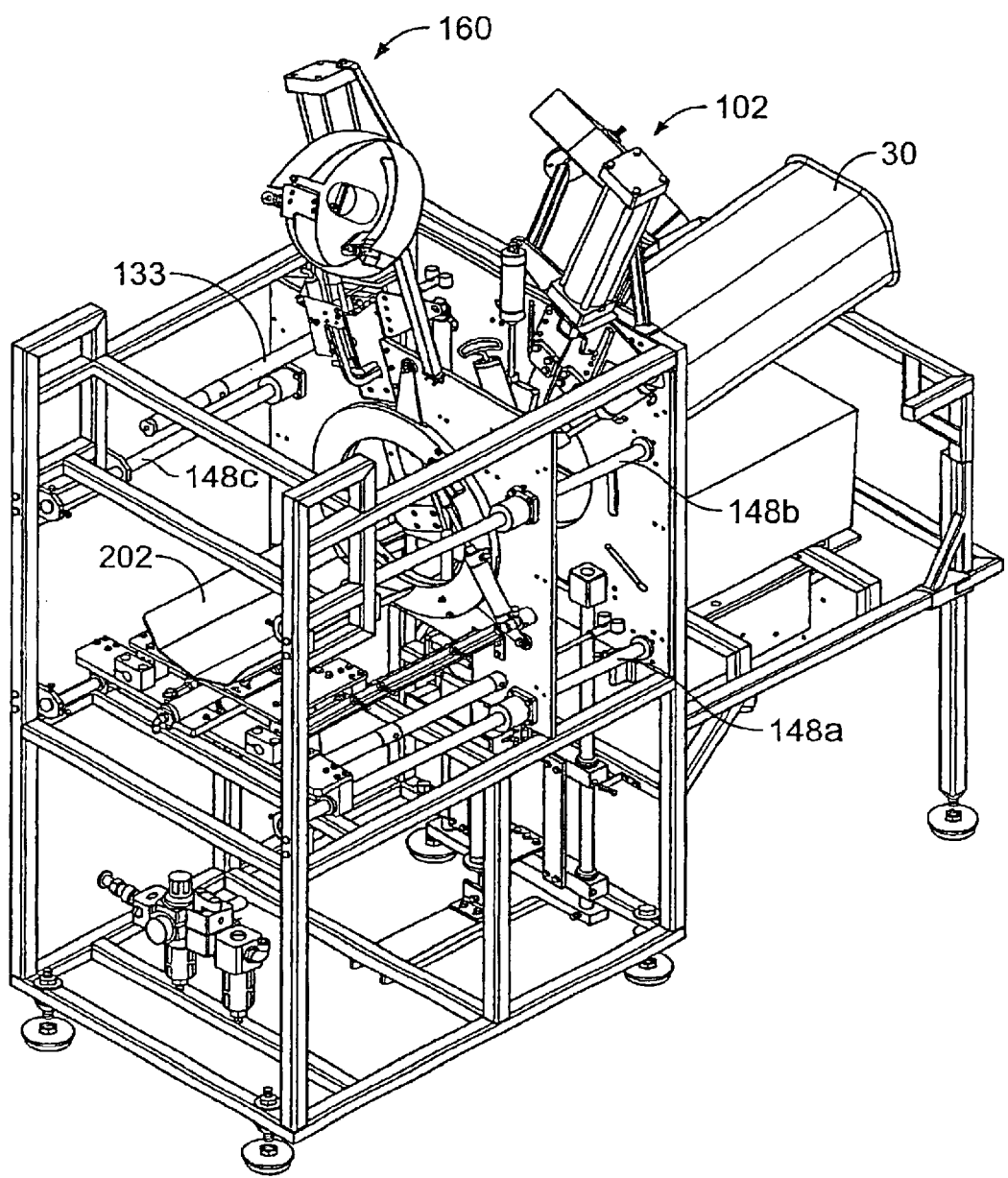
FIG. 3 is a rear perspective view of the apparatus of the preferred embodiment of the present invention.

While the invention may be susceptible to embodiments in different forms, there is shown in the drawings, and herein will be described in detail, a specific embodiment with the understanding that the present disclosure is to be considered an exemplification of the principles of the invention, and is not intended to limit the invention to that as illustrated and described herein. For example, the present disclosure describes the method and apparatus as used to encase whole turkeys. The same method and apparatus can be used for other whole poultry, for poultry parts, such as turkey breast, or for any other material that one may wish to enclose in netting, such as hams, sausages, cheeses, or other food or non-food products, without departure from the invention.

The apparatus 2, as shown in FIGS. 1, 1A, 1B, 2, and 3, is built with a frame 4 having a front 6, rear 8, left 10, and right 12. Attached to the frame are a product tube 30, a first iris plate 60, a moving iris plate 132, a tray 202, an orienter 216, a handle maker 230, a printer 260, an air supply 274, and electronic controls 276. A scale 16 is located apart from but close to the front of the frame 6.

The product tube 30 is a cylinder, open at both ends, and is attached to the front of the frame 6. In one embodiment, the product tube 30 is oriented to slope down slightly toward the rear 8, so that products, such as turkeys, placed in the upper end of the product tube 30 will slide by gravity the length of the product tube 30 and into the netting area of the apparatus 2, as explained below. In another embodiment, a roller tray 32 is placed inside the product tube 30, to allow products, such as hams, to roll the length of the product tube 30 and into the netting area of the apparatus 2, as explained below. In another embodiment, the product tube 30 contains a conveyor belt 33 to deliver the turkeys or hams to the netting area of the apparatus 2, as explained below.

In the preferred embodiment, the product tube 30 is oval in cross-section and is of a sufficient height and width to accommodate the largest turkeys. Any suitable cross-section and size will suffice, depending on the material to be netted. In the gravity-feed embodiment, the product tube 30 has two tube guides 34 and 36 located on the inside, to keep turkeys oriented in the proper direction as they slide the length of the product tube 30. Similar tube guides can be used for other products. Alternatively, a product tube circular in cross-section can be used for cylindrical products such as sausages. A roller tray, robotic arms, or any other means of delivering the materials to be encased into the apparatus 2 can be used.

The netting 38 is, in the preferred embodiment, comprised of a hard but flexible plastic. It is manufactured in a cylindrical shape and rolled into a torus. One end of the roll of netting 38 is clipped to close it and the roll is then placed around the outside of the product tube 30. A brake ring 40 is used to hold the netting 38 in place. In the preferred embodiment, the brake ring 40 comprises a flexible cable, attached to an air cylinder, and surrounding the netting 38 on the product tube 30. The air cylinder actuates to tighten the cable to hold the netting 38 snugly to the product tube 30, or releases to loosen the cable around the netting 38. After material such as a turkey has traveled down the product tube 30, contacted the netting 38, and landed on the dump tray 206, as later explained, the air cylinder actuates, tightening the cable, and providing resistance to further unfurling of the netting 38. The air cylinder shuts off after the turkey has been clipped, as later explained, loosening the cable and freeing the netting 38 for unfurling by the next turkey. In another embodiment, the brake ring 40 is a flexible rubber hose, attached to an air supply, surrounding the product tube 30 to hold the netting 38 in place. A simple rubber band can also be used to hold the netting about the product tube.

Figure 4:
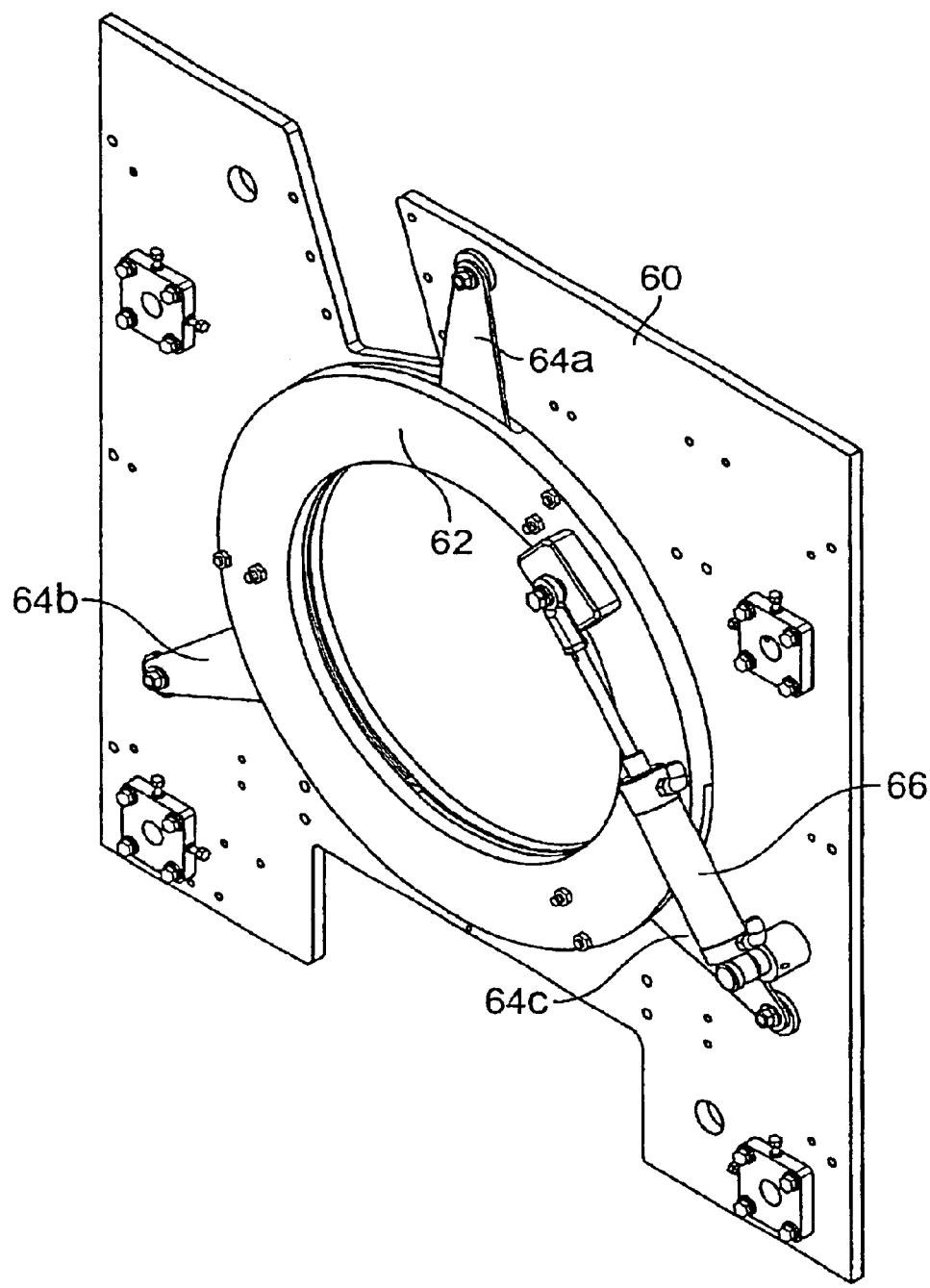
FIG. 4 is a view of the first iris plate of the apparatus of the preferred embodiment of the present invention.
Figure 5:
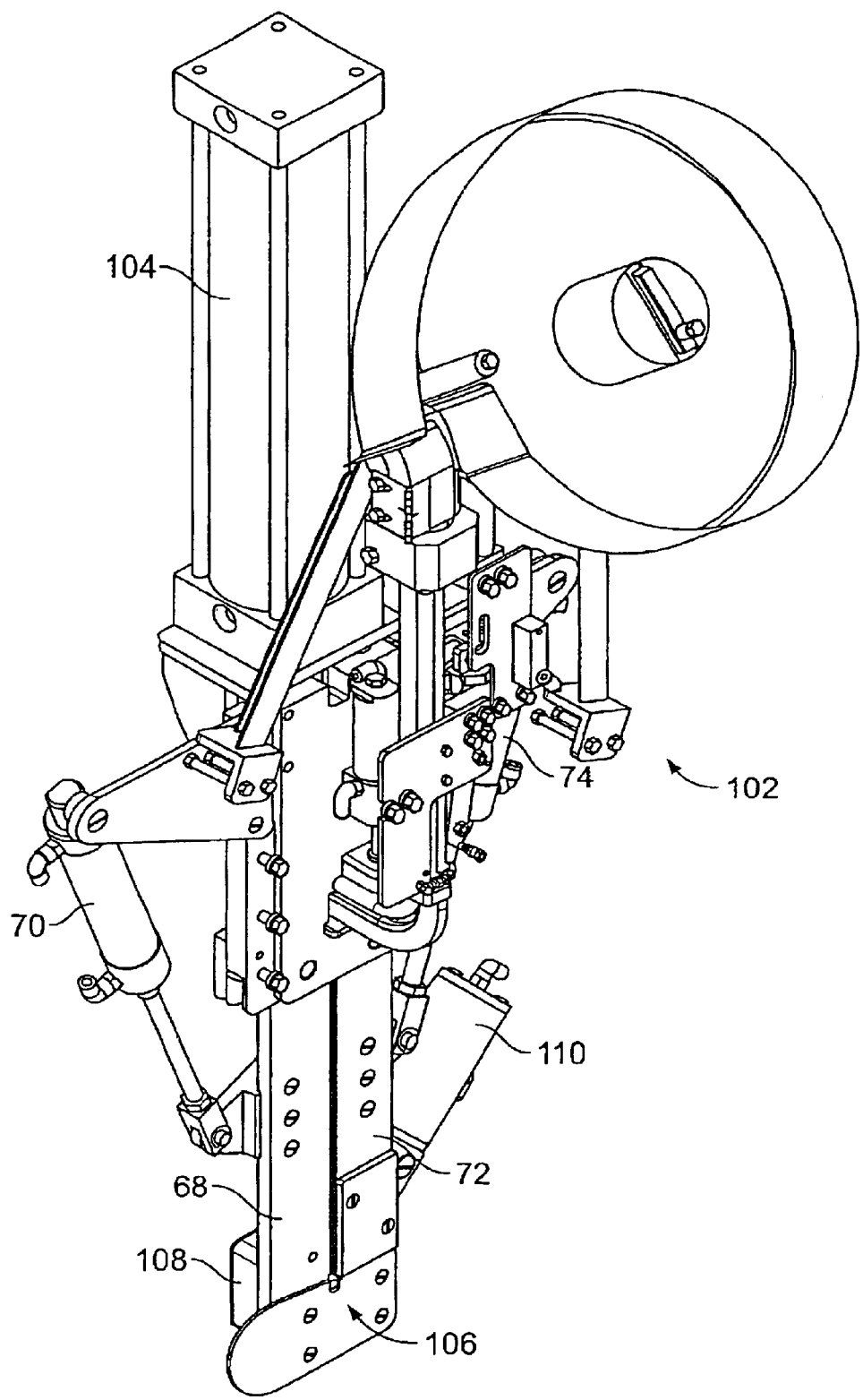
FIG. 5 is a view of the first clipper of the apparatus of the preferred embodiment of the present invention.

The product tube 30 leads to a first iris plate 60. The first iris plate 60, shown in more detail in FIG. 4, comprises a vertically oriented sheet of material containing a first iris 62. The first iris 62 comprises three separators 64a, 64b, and 64c, which are actuated by a first iris separator cylinder 66. A first iris left gate assembly 68 and a first iris right gate assembly 72 are attached to the rear of the first iris plate, as shown in FIG. 5. These two gate assemblies are actuated by a first iris left gate cylinder 70 and a first iris right gate cylinder 74. The three separators 64a, 64b, and 64c operate like a camera lens, to open to allow material, such as a turkey, to pass through it, and to close to gather the netting 38. The first iris left gate assembly 68 and the first iris right gate assembly 72 rotate inwardly to further gather the netting 38 and retract to allow material, such as a turkey, to pass through the first iris 62. FIG. 5 shows the first iris left gate assembly 68 and a first iris right gate assembly 72 rotated inward to the closed position.

A first clipper 102, shown in FIG. 5, is attached to the first iris plate 60. The first clipper 102 is actuated by a first clipper main cylinder 104 and has a first clipper die support 106. A knife 108 is also attached to the first iris plate 60 and is actuated by a knife cylinder 110. The first clipper 102 clips the netting 38 after it has been gathered by the first iris 62 and the first iris left gate assembly 68 and the first iris right gate assembly 72. The knife 108 severs the netting 38 after it has been clipped.

Figure 6:
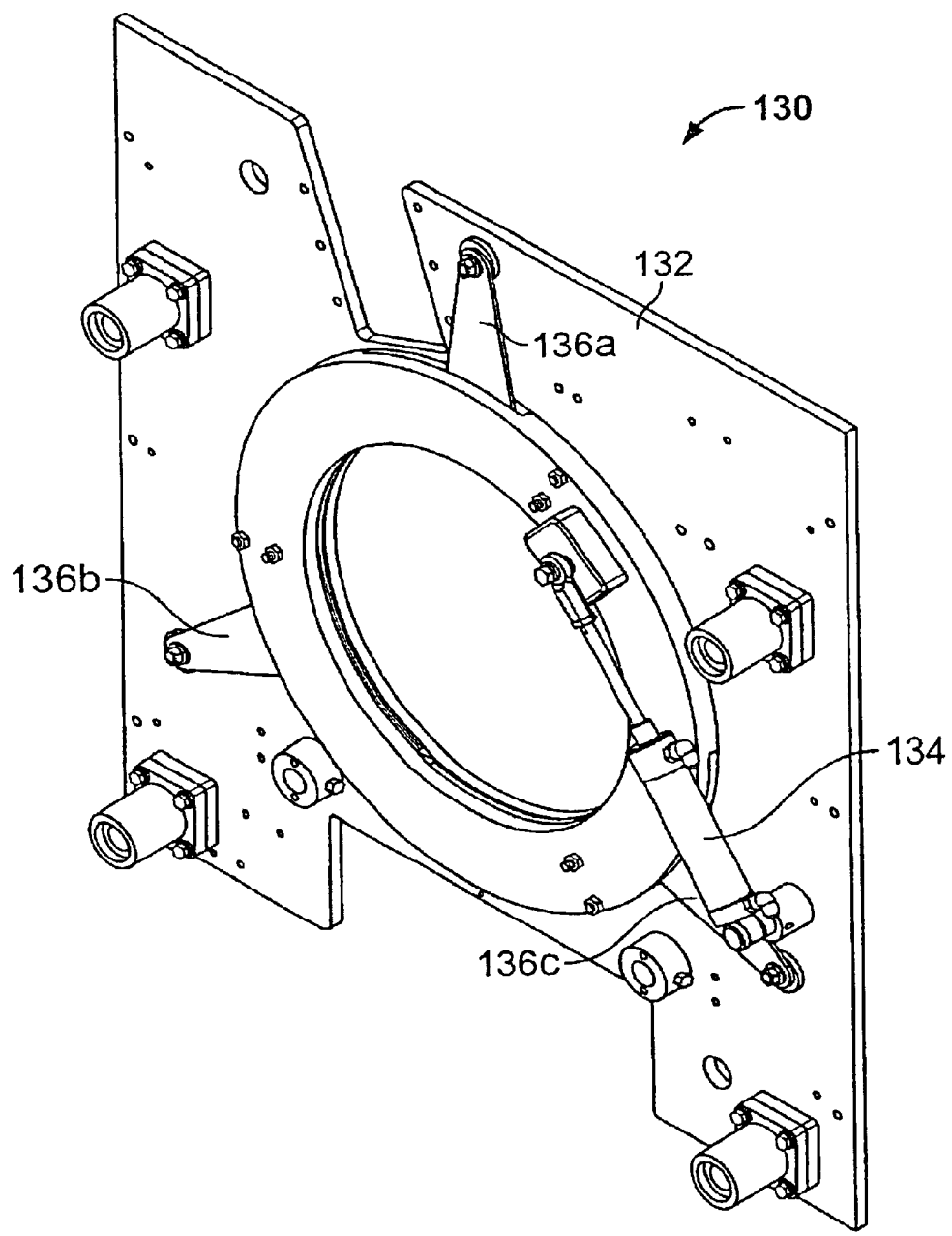
FIG. 6 is a view of the moving iris plate of the apparatus of the preferred embodiment of the present invention.

To the rear of the first iris plate is a moving iris plate 132, shown in FIG. 6. The moving iris plate 132 is moved by a moving iris plate cylinder 133. The moving iris plate 132 travels along four traveling rods 148a, 148b, 148c, and 148d, which are attached to the first iris plate 60 and to the frame 4, so that the moving iris plate 132 is always parallel to the first iris plate 60.

The moving iris plate 132 comprises a vertically oriented sheet of material containing a moving iris 130. The moving iris 130 comprises three separators 136a, 136b, and 136c, and operates like a camera lens, to open to allow material, such as a turkey, to pass through it, and to close to gather the netting 38. The separators 136a, 136b, and 136c are actuated by a moving iris separator cylinder 134.

To accommodate the largest turkeys, an opening must be 14 inches in diameter. The use of three separators 136a, 136b, and 136c in the moving iris 130 and three separators 64a, 64b, and 64c in the first iris 62 allows for use of actuating cylinders 66 and 134 with only a four-inch movement, which can be operated quickly to achieve high production rates.

Figure 7:
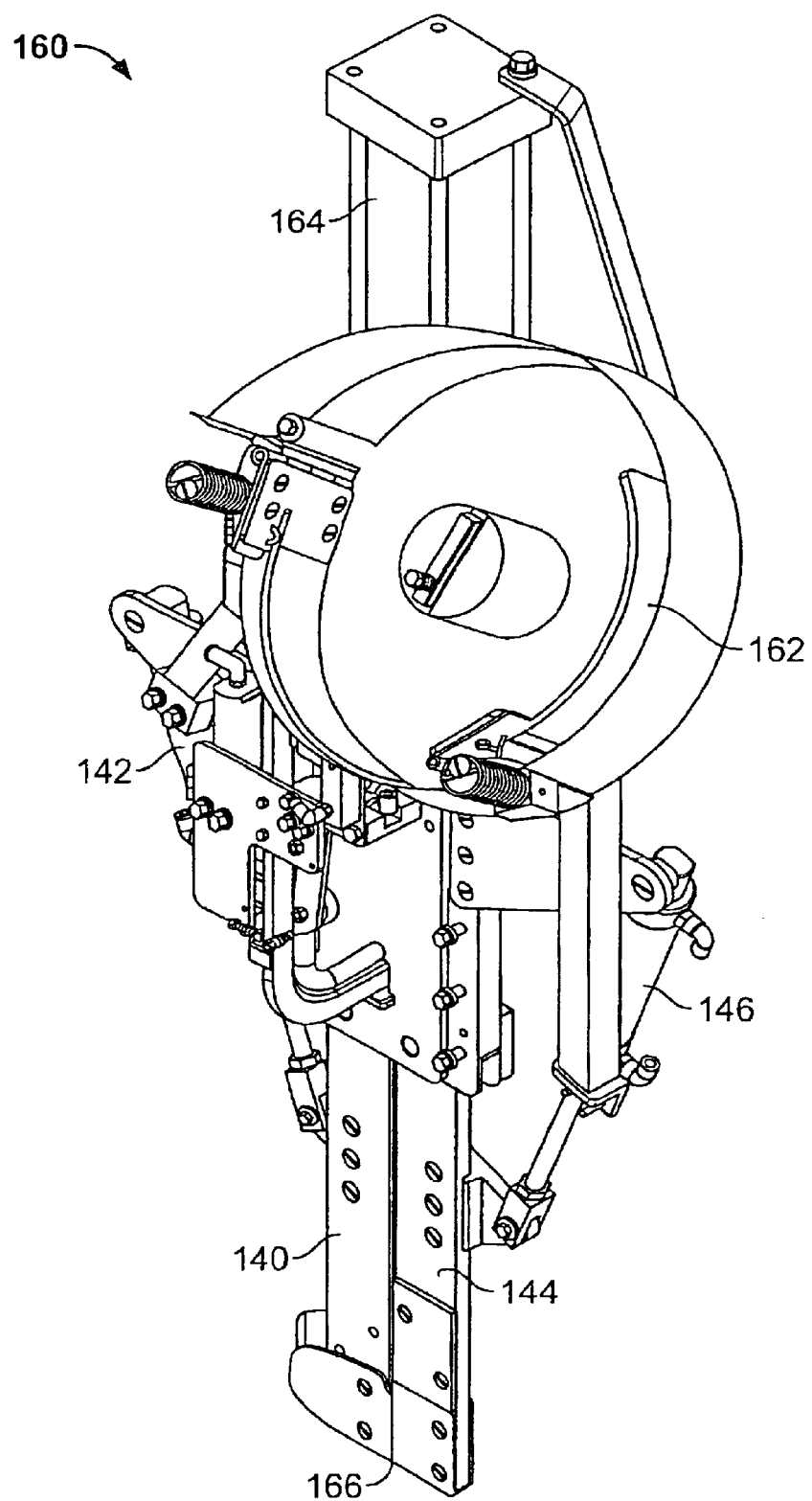
FIG. 7 is a view of the second clipper of the apparatus of the preferred embodiment of the present invention.

A moving iris left gate assembly 140 and a moving iris right gate assembly 144 are attached to moving iris plate 132 at the front of the moving iris 130, as shown in FIG. 7. These two gate assemblies 140 and 144 are actuated by a moving iris left gate cylinder 142 and a moving iris right gate cylinder 146. The moving iris left gate assembly 140 and a moving iris right gate assembly 144 operate in the same manner as described above for the first iris plate 60: the moving iris left gate assembly 140 and a moving iris right gate assembly 144 rotate inward to gather the netting and rotate outward to allow material, such as a turkey, to pass through the moving iris 130.

A second clipper 160, shown in FIG. 7, is attached to the moving iris plate 132. The second clipper 160 is actuated by a second clipper cylinder 164 and contains a die support 166. The second clipper 160 clips the netting 38 after it has been gathered by the moving iris 130 and the moving iris left gate assembly 140 and a moving iris right gate assembly 144. When a handle is desired on the package, the second clipper 160 clips the netting after it has been gathered and after the handle maker 230, described below, has formed a loop in the netting 38. Note that, in the preferred embodiment, the second clipper 160 contains a reel brake 162 to hold the clips tightly and to prevent shaking of the clips as the second clipper 160 travels.

Figure 8:
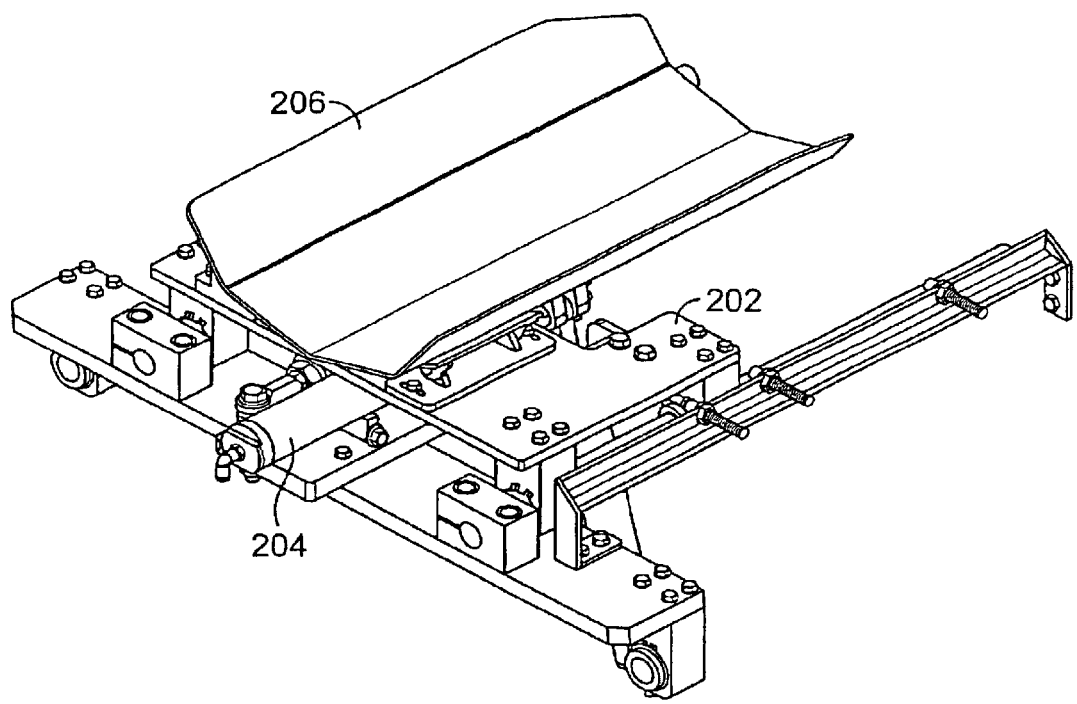
FIG. 8 is a view of the dump tray of the apparatus of the preferred embodiment of the present invention.

To the rear of the moving iris plate 132 is the tray 202, shown in FIG. 8. The tray 202 is mounted to the traveling rods 148a, 148b, 148c, and 148d and moves in a front to rear direction, actuated by a tray cylinder 204. Mounted on top of the tray 202 is a dump tray 206, which is actuated by a dump tray cylinder 212. The dump tray 206 is sized to accommodate the material being netted. In one embodiment, the dump tray 206 contains a dump tray eye that senses when material arrives on the dump tray 206. In another embodiment, the dump tray 206 contains two pan flanges, to control the orientation of the turkey on the dump tray 206.

When the tray 202 is in its most forward position, the dump tray 206 protrudes through the moving iris 130 and the first iris 62, which are open. Material, such as a turkey, slides down the product tube 30, either by gravity feed or by direct delivery on a conveyor, contacts the closed end of the roll of netting 38, moves through the first iris 62 and the moving iris 130, pulling the netting 38 along, and lands on the dump tray 206. The moving iris 130 and the first iris 62 then close to gather the netting 38 as described above. The tray 202 then retracts to the rear, taking along the dump tray 206 and the turkey, and slightly tightening the netting 38 around the turkey.

Figure 9:
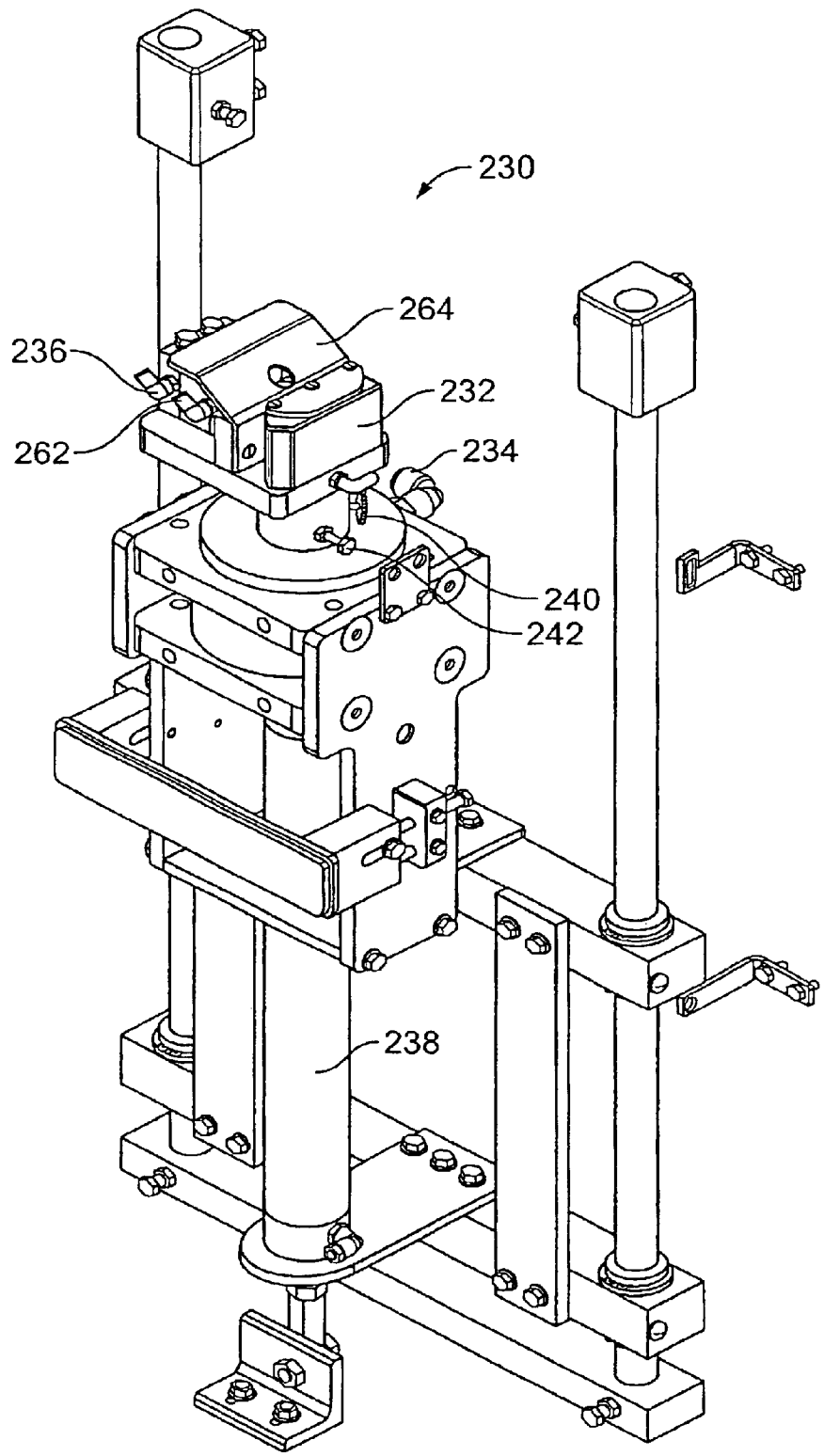
FIG. 9 is a view of the handle maker of the apparatus of the preferred embodiment of the present invention.

The handle maker 230, shown in FIG. 9, is comprised of a handle maker clamp 232, a rotating cylinder 234, a clamping cylinder 236, a lifting cylinder 238, a first prox switch 240, a second prox switch 242, and a vacuum assembly 262. The handle maker 230 is located just to the rear and just below the first iris plate 60. The rotating cylinder 234 causes the handle maker clamp 232 to rotate in a horizontal plane. The lifting cylinder 238 causes the handle maker 230 to arise and descend vertically. The clamping cylinder 236 causes the handle maker clamp 232 to open and close. The two prox switches 240 and 242 sense the location and limits of movement of the handle maker clamp 232.

The handle maker 230 ascends after the netting 38 has been gathered and the netting 38 is stretched inside the open handle maker clamp 232. The handle maker clamp 232, when actuated, closes to grasp the netting 38. After the first clipper 102 has clipped the netting 38 and the knife 108 has severed the netting 38, the handle maker 230 rotates, actuated by the rotating cylinder 234, to form a loop in the netting 38. The second clipper 160 then clips the netting 38 to close the netting around the turkey and to form a handle in the netting 38.

Figure 10:
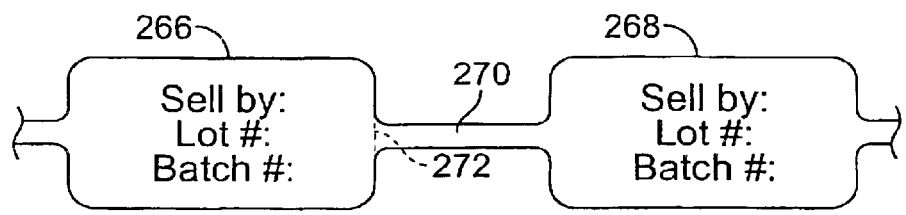
FIG. 10 is a view of sample labels of the preferred embodiment of the present invention.

The printer 260 is located below the product tube 30. It is a standard printer of any suitable manufacture, so long as it is capable of printing labels 266. The labels 266, shown in FIG. 10, comprise a label body 268, a label neck 270, and a perforation 272. A tag clamp 264 grabs a label 266 as it exits the printer 260, pulls on the label 266 to tear it at the perforation 272, and places the label 266 on top of the handle maker clamp 232. A vacuum assembly 262 holds the label 266 in place. When a label 266 is desired, the label neck 270 protrudes next to the netting 38. The second clipper 160, when it clips the netting as described above, clips both netting 38 and the label neck 270, so that the label 266 is securely fastened to the package.

The scale is placed at a convenient location near the front of the frame 6. The scale communicates with the printer 260 through a scale cable 18. The weight of the material, such as a turkey, is transmitted to the printer 260. When the printer 260 prints the label 266, it can add the weight of the turkey as well as any other data that is desired.

All moving parts are actuated by air cylinders as described above. Each air cylinder is connected to a standard air supply (not shown). An electronic control 276 monitors and operates the apparatus 2 by controlling the various cylinders. In the preferred embodiment, the electronic control is a standard Siemens central processing unit, with a "power 5 6EP1333-1SL11" power supply, a "Simatic S7-300 314-1AEO4-0AB0" PLC, a 32-output "SM322 321-1 BL00-0AA0" card, a 32-input "SM 321 321-ABL00-0AA0" card, and a 16-input "SM 321 321-1BH0S-0AA 0" card.

All moving parts are enclosed by doors (not shown) with limit switches (not shown) to sense the position of the doors. For safety, the entire apparatus will stop all movement if a door is opened. In the preferred embodiment, a Banner Machine Safety GM-FA-10J module monitors and controls all limit switches.

Please note that the clippers 102 and 160 have unique features. To achieve the objects of the invention, the clippers 102 and 160 must have long gates, the cylinders 104 and 164 must be offset to the side instead of being right over the clip channel (to save room), the punch holder must be offset to the center line of the punch (to shorten the height of the apparatus 2 in order to fit into standard rooms), and the punch, which is a standard wear item, must be able to be changed in about one minute, instead of the usual 30 minutes change time.

To begin operation of the apparatus 2, the netting 38 is placed over the product tube 30. The netting 38 is clipped in a standard manner, at the rear of the product tube 30. At this point, both irises 62 and 130 are open, the moving iris plate 132 is moved to its most forward position, just behind the first iris plate 60, the tray 202 has moved to its most forward position, and the dump tray 206 protrudes through the eyes of each of the irises 62 and 130. The handle maker 230 is at its recessed or most downward position.

The material to be netted, such as a dressed and wrapped turkey, is placed on the scale 16. The scale 16 weighs the product and transmits this data to the printer 260. The printer 260 prints a label 266 with whatever data is required, such as weight, cost per pound, and total cost. The printer 260 ejects the label 266, whereupon the tag clamp 264 grasps the label 266, tears it at the perforation 272, and places it on the handle maker clamp 232. The vacuum assembly 262 draws a slight vacuum through two small holes on the handle maker clamp 232, to keep the label 266 in place.

In the meantime, the operator takes the turkey off the scale and places it in the product tube 30. In the gravity feed embodiment, because of the downward slant of the product tube 30, the turkey slides down the product tube 30, maintaining its orientation by virtue of the product guides 34 and 36. If it fails to slide, a slight push by the operator will propel it. For this reason, the product tube is longer than a person's arm, to keep the operators hands out of any moving parts. If a conveyor 33 is used, then the turkey is conveyed directly to netting area. The turkey slides against the clipped end of the netting 38, through the first iris 62 and the moving iris 130, and onto the dump tray 206. The dump tray eye 214 senses the arrival of the turkey and signals the electronic control 276. Since the end of the netting 38 had been clipped, the turkey pulls the netting 38 along with it. The brake ring 40 prevents the netting 38 from unrolling too much and maintains a slight amount of tension on the netting 38.

The tray 202 then moves toward the rear, taking, of course, the dump tray 206 and the turkey with it, moving an amount sufficient to clear both irises 62 and 130. Both irises 62 and 130 close, somewhat gathering the netting 38. The moving iris plate 132 and the tray 202 then move to the rear, pulling the netting 38 through the now-closed moving iris 130 and tautening the netting 38 around the turkey. Please note that the traveling components, the moving iris plate 132 and the tray 202, only move as far to the rear as is necessary, and merely make the netting 38 snug around the turkey, not tight.

The handle maker 230 now rises and the handle maker clamp 232 closes, grasping the netting 38. The first iris left gate assembly 68 and first iris right gate assembly 72 rotate toward the center of the first iris 62, further grasping the netting 38.

The first clipper 102 now fires to clip the netting 38 at the point where it is grasped in the center of the first iris 62. As soon as the first clipper 102 fires, the knife 108 cuts the netting 38 just to the rear of the newly-applied clip.

The handle maker 230 now rotates 180 degrees horizontally to make a loop out of the gathered netting 38. The moving iris plate 132 moves forward slightly, about five inches, in order to provide enough slack for the handle maker clamp 232 to rotate. When the handle maker 230 rotates, it pulls the netting 38 tightly around the turkey. This step allows the apparatus 2 to accommodate any size of turkey and still obtain a tight fit of netting 38.

As soon as the handle maker clamp 232 has rotated 180 degrees, as sensed by the prox switches 240 and 242, the moving iris left gate assembly 140 and moving iris right gate assembly 144 rotate toward the center of the moving iris 130, further grasping the netting 38. The netting 38 is now gathered by the moving iris 130 and by the moving iris left and right gate assemblies 140 and 144, so that the netting 38 tightly encloses the turkey, then forms a loop around the handle maker clamp 232 and extends back in between the moving iris left and right gate assemblies 140 and 144 to form a loop. The neck 270 of the label 266 also extends into this same area.

The second clipper 160 now fires, clipping the netting 38 and label 266 together. The handle maker clamp 232 then descends to its original, downward position and rotates back to its original orientation, the tray 202 and the moving iris plate 132 move to the most rearward position, all gate assemblies 68, 72, 140, and 144 rotate back to their original, open positions, and both irises 62 and 130 open.

The dump tray 206 then rotates to the right, dumping the now-netted turkey out of the apparatus 2. The dump tray 206 then retracts to its original, level position and the tray 202 and moving iris plate 132 move forward to their original positions. The dump tray 206 then moves forward into its original position inside the now-open irises 62 and 130. The apparatus 2 is now ready for another turkey.

Please note that many variations can be made of this method without departing from the invention. For example, the dump tray 206 can dump the netted turkey out either the left or right side of the apparatus 2, or even out the rear, depending on the user's needs. The handle maker step can be eliminated if no handle is desired, or the label step can be eliminated if no label is desired.

While a preferred embodiment of the present invention is shown and described, it is envisioned that those skilled in the art may devise various modifications of the present invention without departing from the spirit and scope of the appended claims.

We claim:

1. An apparatus for enclosing material in a net, comprising
   a roll of netting, said roll having an open end and a closed end,
   means to place material in said netting through said open end of said roll,
   first means to gather said netting around said material,
   second means to gather said netting around said material,
   means for moving said second means to gather relative to said first means to gather,
   whereby said netting is stretched between said first means to gather and said second means to gather,
   a first clipper to close and sever said netting at said first means, to create a new closed end on said severed roll,
   a handle maker to form a loop from said stretched netting, and a second clipper to close said loop at said second gathering means.

2. The apparatus of claim 1, further comprising means for printing information on a label and means for attaching said label to said netting.

3. The apparatus of claim 2, further comprising a scale to measure a weight of said material and transmit said weight to said means for printing.

4. An apparatus for enclosing material in a net, comprising:
- a frame;
- a product tube carried by said frame, and adapted for receiving a net and for maintaining a first end of said net in an open position, a second end of said net being in a closed position, whereby the material to be enclosed can be conveyed from a first end of said product tube to engage said second end of said net at a second end of said product tube and unfurl a portion off said net from said product tube;
- a first iris held by said frame adjacent to said second end of said product tube and adjustable from an open position forming an aperture larger than the material, to a substantially closed position, whereby the material and said portion of engaged and unfurled net can be conveyed from said second end of said product tube through said first iris aperture and whereby first iris gathers said engaged and unfurled net in said substantially closed position;
- a second iris mounted on said frame and movable from a first position adjacent said first iris, to a second position remote from said first iris; said second iris being adjustable from an open position forming an aperture larger than the material, to a substantially closed position, whereby said second iris gathers said engaged and unfurled net in said substantially closed position;
- a tray mounted on said frame and movable from a first position protruding through said first iris and said second iris, to a second position remote from said first iris;
- a first clipper attached to said first iris and positioned to clip and sever the net gathered by said first iris and said second iris when said second iris is in said second position remote from said first iris, to form said closed position of said second end of said net on said product tube and a gathered strand of net on the material;
- a clamp rotatably attached to said frame to grasp said gathered strand and to rotate to form a loop in the gathered and severed net;
- a second clipper attached to said second iris and positioned to clip said loop to form a handle on the net on the material.

5. The apparatus of claim 4, further comprising:
- a printer to print data on a label;
- a tag clamp attached to said frame to place said label in said rotating clamp whereby said second clipper attaches said label to said handle.

6. The apparatus of claim 5, further comprising a scale to weigh the material and wherein said data comprises a weight of the material.

7. The apparatus of claim 4, further comprising a brake ring on said product tube to provide resistance to unfurling of said net from said product tube.

8. The apparatus of claim 7, wherein said brake ring comprises an air-actuated tightenable cable.

9. The apparatus of claim 7, wherein said brake ring comprises a flexible hose attached to an air supply.

10. The apparatus of claim 7, wherein said brake ring comprises a rubber band.

11. The apparatus of claim 4, wherein said product tube is slanted to convey the material by gravity from said first end of said product tube to said second end of said product tube.

12. The apparatus of claim 4, wherein said product tube is slanted to convey the material by gravity from said first end of said product tube to said second end of said product tube and through said aperture of said first iris and said aperture of said second iris.

13. The apparatus of claim 4, further comprising a roller tray to convey the material from said first end of said product tube to said second end of said product tube.

14. The apparatus of claim 4, further comprising a conveyor belt to convey the material from said first end of said product tube to said second end of said product tube.

15. The apparatus of claim 4, further comprising tube guides in said product tube to orient the material.

16. The apparatus of claim 4, further comprising means to remove said material from said tray.

17. The apparatus of claim 4, further comprising means to rotate said tray.

18. An apparatus for enclosing material, comprising:
- a net;
- a frame;
- a product tube carried by said frame, receiving said net, and maintaining a first end of said net in an open position, a second end of said net being in a closed position, whereby the material to be enclosed can be conveyed from a first end of said product tube to engage said second end of said net at a second end of said product tube and unfurl said net from said product tube;
- a first iris held by said frame adjacent to said second end of said product tube and adjustable from an open position forming an aperture larger than the material, to a substantially closed position, whereby the material and said portion of engaged and unfurled net can be conveyed from said second end of said product tube through said first iris aperture and whereby first iris gathers said engaged and unfurled net in said substantially closed position;
- a second iris mounted on said frame and movable from a first position adjacent said first iris, to a second position remote from said first iris; said second iris being adjustable from an open position forming an aperture larger than the material, to a substantially closed position, whereby said second iris gathers said engaged and unfurled net in said substantially closed position;
- a tray mounted on said frame and movable from a first position protruding through said first iris and said second iris, to a second position remote from said first iris;
- a first clipper attached to said first iris and positioned to clip and sever the net gathered by said first iris and said second iris when said second iris is in said second position remote from said first iris, to form said closed position of said second end of said net on said product tube and a gathered strand of net on the material;
- a clamp rotatably attached to said frame to grasp said gathered strand and to rotate to form a loop in the gathered and severed net;
- a second clipper attached to said second iris and positioned to clip said loop to form a handle on the net on the material.

19. The apparatus of claim 18, further comprising:

a printer to print data on a label;

a tag clamp attached to said frame to place said label in said rotating clamp whereby said second clipper attaches said label to said handle.

20. The apparatus of claim 19, further comprising a scale to weigh the material and wherein said data comprises a weight of the material.

21. The apparatus of claim 18, further comprising a brake ring on said product tube to provide resistance to unfurling of said net from said product tube.

22. The apparatus of claim 21, wherein said brake ring comprises an air-actuated tightenable cable.

23. The apparatus of claim 21, wherein said brake ring comprises a flexible hose attached to an air supply.

24. The apparatus of claim 21, wherein said brake ring comprises a rubber band.

25. The apparatus of claim 18, wherein said product tube is slanted to convey the material by gravity from said first end of said product tube to said second end of said product tube.

26. The apparatus of claim 18, wherein said product tube is slanted to convey the material by gravity from said first end of said product tube to said second end of said product tube and through said aperture of said first iris and said aperture of said second iris.

27. The apparatus of claim 18, further comprising a roller tray to convey the material from said first end of said product tube to said second end of said product tube.

28. The apparatus of claim 18, further comprising a conveyor belt to convey the material from said first end of said product tube to said second end of said product tube.

29. The apparatus of claim 18, further comprising tube guides in said product tube to orient the material.

30. The apparatus of claim 18, further comprising means to remove said material from said tray.

31. The apparatus of claim 18, further comprising means to rotate said tray.

* * * * *